(12) United States Patent
Schmitz et al.

(10) Patent No.: US 10,347,889 B2
(45) Date of Patent: Jul. 9, 2019

(54) MICROPOROUS SEPARATOR FILM HAVING HOMOGENEOUS POROSITY AND GREATER RESISTANCE TO PUNCTURING

(71) Applicants: Bertram Schmitz; Detlef Busch; Dominic Klein

(72) Inventors: Bertram Schmitz, Saarbrücken (DE); Detlef Busch, Saarlouis (DE); Dominic Klein, Bexbach (DE)

(73) Assignee: Treofan Germany GmbH & Co. KG (DE)

( * ) Notice: Subject to any disclaimer, the term of this patent is extended or adjusted under 35 U.S.C. 154(b) by 725 days.

(21) Appl. No.: 14/433,887

(22) PCT Filed: Oct. 4, 2013

(86) PCT No.: PCT/EP2013/002987
§ 371 (c)(1),
(2) Date: Apr. 7, 2015

(87) PCT Pub. No.: WO2014/056591
PCT Pub. Date: Apr. 17, 2014

(65) Prior Publication Data
US 2015/0263322 A1 Sep. 17, 2015

(30) Foreign Application Priority Data

Oct. 8, 2012 (DE) .......... 10 2012 019 626
Feb. 1, 2013 (DE) .......... 10 2013 001 700

(51) Int. Cl.
| | |
|---|---|
| *B29C 71/02* | (2006.01) |
| *C08J 5/18* | (2006.01) |
| *H01M 2/14* | (2006.01) |
| *H01M 2/16* | (2006.01) |
| *B29C 48/08* | (2019.01) |
| *B29C 48/88* | (2019.01) |
| *B32B 27/32* | (2006.01) |
| *H01M 10/052* | (2010.01) |

(52) U.S. Cl.
CPC .......... *H01M 2/1653* (2013.01); *B29C 48/08* (2019.02); *B32B 27/32* (2013.01); *C08J 5/18* (2013.01); *H01M 2/145* (2013.01); *H01M 2/166* (2013.01); *H01M 2/1646* (2013.01); *H01M 2/1686* (2013.01); *B29C 48/914* (2019.02); *B29C 71/02* (2013.01); *H01M 10/052* (2013.01); *H01M 2220/20* (2013.01)

(58) Field of Classification Search
CPC .......... H01M 2/1653; H01M 2/145; H01M 2/1686; H01M 2/166; H01M 2/1646; H01M 2220/20; H01M 10/052; C08J 5/18; B29C 47/0021; B29C 47/8845; B29C 48/08; B29C 48/914; B29C 71/02; B32B 27/32
See application file for complete search history.

(56) References Cited

U.S. PATENT DOCUMENTS

| | | | |
|---|---|---|---|
| 5,231,126 A | 7/1993 | Shi et al. | |
| 5,683,634 A | 11/1997 | Fujii et al. | |
| 6,921,608 B2 | 7/2005 | Call et al. | |
| 8,597,775 B2 * | 12/2013 | Rhee | B01D 71/26 428/212 |
| 8,795,900 B2 | 8/2014 | Schmitz et al. | |
| 8,802,270 B2 | 8/2014 | Schmitz et al. | |
| 8,889,284 B2 * | 11/2014 | Busch | B29C 55/005 264/46.1 |
| 8,920,913 B2 * | 12/2014 | Rhee | B32B 7/02 428/212 |
| 8,927,135 B2 * | 1/2015 | Busch | B32B 27/32 264/46.1 |
| 9,455,432 B2 * | 9/2016 | Shi | H01M 2/1686 |
| 2009/0117454 A1 * | 5/2009 | Takita | B01D 69/02 429/145 |
| 2009/0169862 A1 * | 7/2009 | Rhee | B32B 27/32 428/315.7 |
| 2009/0226813 A1 * | 9/2009 | Takita | B01D 67/0083 429/247 |
| 2009/0226814 A1 * | 9/2009 | Takita | B01D 67/0027 429/247 |
| 2009/0253032 A1 * | 10/2009 | Takita | B29C 55/065 429/145 |
| 2011/0064990 A1 * | 3/2011 | Mohr | B29C 55/023 429/145 |
| 2011/0244336 A1 * | 10/2011 | Schmitz | C08J 5/18 429/253 |
| 2011/0269900 A1 * | 11/2011 | Tamura | B01D 67/002 524/584 |
| 2012/0070644 A1 * | 3/2012 | Kang | B01D 69/02 428/220 |

(Continued)

FOREIGN PATENT DOCUMENTS

| | | |
|---|---|---|
| DE | 3610644 A1 | 10/1986 |
| DE | 4420989 A1 | 12/1995 |

(Continued)

OTHER PUBLICATIONS

International Search Report for PCT/EP2013/002987 dated Dec. 10, 2013.

(Continued)

*Primary Examiner* — Jeffrey M Wollschlager
(74) *Attorney, Agent, or Firm* — Ashley I. Pezzner

(57) ABSTRACT

The present invention relates to a microporous film and use thereof as separator with greater resistance to puncturing.

17 Claims, No Drawings

(56) References Cited

U.S. PATENT DOCUMENTS

| | | | |
|---|---|---|---|
| 2012/0101180 A1* | 4/2012 | Yamada | B29C 55/005 |
| | | | 521/143 |
| 2012/0189815 A1* | 7/2012 | Matsui | C08L 23/12 |
| | | | 428/156 |
| 2012/0202905 A1 | 8/2012 | Busch et al. | |
| 2013/0021719 A1 | 1/2013 | Busch et al. | |
| 2013/0052539 A1 | 2/2013 | Azais et al. | |
| 2013/0302696 A1* | 11/2013 | Ishihara | H01M 2/145 |
| | | | 429/253 |

FOREIGN PATENT DOCUMENTS

| | | |
|---|---|---|
| EP | 0557721 A2 | 9/1993 |
| EP | 0951080 A1 | 10/1999 |
| EP | 0967671 A2 | 12/1999 |
| EP | 1369221 A1 | 12/2003 |
| EP | 2381510 A1 | 10/2011 |
| EP | 2444453 A1 | 4/2012 |
| WO | WO-2010066389 A1 | 6/2010 |
| WO | WO-2010066390 A1 | 6/2010 |
| WO | WO-2010145770 A1 | 12/2010 |
| WO | WO-2011047797 A1 | 4/2011 |
| WO | WO-2011076375 A2 | 6/2011 |
| WO | WO-2011076805 A1 | 6/2011 |
| WO | WO-2011134626 A1 | 11/2011 |

OTHER PUBLICATIONS

International Preliminary Report on Patentability for PCT/EP2013/002987 dated Apr. 8, 2015.

\* cited by examiner

MICROPOROUS SEPARATOR FILM HAVING HOMOGENEOUS POROSITY AND GREATER RESISTANCE TO PUNCTURING

CROSS-REFERENCE TO RELATED APPLICATIONS

This application is a national stage application (under 35 U.S.C. § 371) of PCT/EP2013/002987, filed Oct. 4, 2013, which claims benefit of German Application No. 10 2012 019 626.1, filed Oct. 8, 2012, and German Application No. 10 2013 001 700.9, filed Feb. 1, 2013, all of which are incorporated herein by reference in their entirety.

The present invention relates to a microporous film and use thereof as a separator with greater resistance to puncturing.

Modern appliances require a power source, such as batteries or accumulators, which enable independent use in space. Batteries have the disadvantage that they have to be disposed of. Accumulators (secondary batteries), which can be charged again and again with the aid of charging devices, are therefore used increasingly. Conventional nickel-cadmium accumulators (NiCd accumulators) for example can achieve a service life of approximately 1000 charging cycles with proper use.

Lithium, lithium-ion, lithium-polymer, and alkaline earth batteries are nowadays used increasingly as accumulators in high-energy or high-performance systems.

Batteries and accumulators always consist of two electrodes, which dip into an electrolyte solution, and a separator, which separates the anode and cathode. The various accumulator types differ by the used electrode material, the electrolyte and the used separator. A battery separator has the task of physically separating the cathode and anode in batteries, for example the negative and positive electrodes in accumulators. The separator must be a barrier which electrically isolates the two electrodes from one another in order to avoid internal short circuits. At the same time, however, the separator must be permeable for ions so that the electrochemical reactions in the cell can take place.

A battery separator must be thin so that the internal resistance is as low as possible and a high packing density can be attained. Only in this way are good performance data and high capacitances possible. In addition it is necessary that the separators absorb the electrolyte and ensure the gas exchange when the cells are full. Whereas, previously, woven fabric was used inter alia, fine pored materials are nowadays used predominantly, such as non-wovens and membranes.

In lithium batteries the occurrence of short circuits is a problem. Under thermal load the battery separator in lithium-ion batteries may melt and therefore lead to a short circuit with devastating consequences. Similar risks are posed when the lithium batteries are mechanically damaged or overloaded by defective electronics of the charging device.

High-energy batteries based on lithium technology are used in applications in which it is crucial to have available the greatest possible quantity of electrical energy in the smallest space. This is the case for example with traction batteries for use in electric vehicles, but also in other mobile applications in which maximum energy density at low weight is required, for example in the aerospace field. Energy densities from 350 to 400 Wh/L or 150 or 200 Wh/kg are currently attained in high-energy batteries. These high energy densities are achieved by the use of special electrode material (for example Li—CoO2) and the more economical use of housing materials. In Li batteries of the pouch cell type the individual batteries are thus only still separated from one another by a film.

Due to this fact, in these cells higher demands are also placed on the separator, since in the event of an internal short circuit and overheating the explosion-like combustion reactions spread to the adjacent cells.

Separator materials for these applications must have the following properties: They must be as thin as possible so as to ensure a low specific spatial requirement and so as to keep the internal resistance small. In order to ensure these low internal resistances, it is important that the separator also has high porosity. Furthermore, they must be lightweight so that a low specific weight is achieved and they must be absolutely safe. This means that, in the case of overheating or mechanical damage, positive and negative electrode must remain separated under all circumstances so as to prevent further chemical reactions, which lead to fire or explosion of the batteries. In particular a high demand is thus also placed on the separators in terms of the mechanical strength thereof.

Porous films that are constructed from polyolefins, such as polypropylene or polyethylene, are known in principle in the prior art. These materials are used primarily as membranes or separators in batteries or accumulators. Various methods are known in accordance with which polyolefin films with high porosities can be produced: filling methods; cold drawing, extraction methods and ß-crystallite methods. These methods differ in principle by the different mechanisms by which the pores are produced.

By way of example, porous films can be produced by the addition of very high filler quantities. The pores are produced during drawing due to the incompatibility of the fillers with the polymer matrix. In many applications the high filler quantities of up to 40% by weight entail undesirable side effects. For example, the mechanical strength of these porous films is impaired by the high filler quantities in spite of drawing. In addition the pore size distribution is very broad, as a result of which these porous films in principle are not suitable for lithium-ion batteries.

In what is known as the extraction method the pores are produced in principle by dissolving out a component from the polymer matrix by suitable solvent. Here, a wide range of variants have been developed, which differ by the type of additives and the suitable solvents. Both organic and inorganic additives could be extracted. This extraction can be performed as the last method step during production of the film or can be combined with a subsequent drawing.

A method that is older, but that is successful in practice is based on a drawing of the polymer matrix at very low temperatures (cold drawing). To this end, the film is first extruded in the conventional manner and is then annealed for a few hours in order to increase the crystalline proportion. In the next method step the cold drawing is performed in the longitudinal direction at very low temperatures in order to produce a large number of defects in the form of very small microcracks. This pre-drawn film with defects is then again drawn in the same direction at elevated temperatures with higher factors, wherein the defects are enlarged to form pores, which form a network-like structure. These films combine high porosities and good mechanical strength in the direction of their drawing, generally the longitudinal direction. The mechanical strength in the transverse direction however remains inadequate, whereby the resistance to perforation is poor and there is a high tendency for splitting in the longitudinal direction. On the whole, the method is cost-intensive.

A further known method for producing porous films is based on the admixing of β-nucleation agents to polypropylene. As a result of the β-nucleation agent, the polypropylene forms what are known as β-crystallites in high concentrations as the melt cools. With the subsequent longitudinal drawing, the β-phase converts into the alpha-modification of the polypropylene. Since these different crystal forms differ in terms of density, many microscopic defects are also initially produced here and are torn open by the drawing to form pores. The films produced by this method have high porosities and good mechanical strength in the longitudinal and transverse direction and a very good cost effectiveness. These films will also be referred to hereinafter as β-porous films. However, even porous films produced by this method do not have sufficient permeability and mechanical properties to meet the high demands in the case of use as a separator in double-layer capacitors.

Various methods for improving the mechanical properties of separators are now known:

U.S. Pat. No. 6,921,608 describes the improvement of the resistance to puncturing of a separator by lamination against one another of two polyolefin separators, wherein the separator laminate has improved mechanical properties compared with a single-layer separator made of the same material.

EP-A-0951080 describes the manufacture of a mechanically stable separator by forming a three-layer separator, wherein two outer layers with mechanical stability are laminated against a less stable separator.

U.S. Pat. No. 5,683,634 describes the increase of the resistance to puncturing of polyolefin separators by selection of a polymer with high molecular weight.

The object of the present invention therefore lies in providing a porous film or a separator for electrochemical energy stores, which on the one hand meets the demands placed on high porosity and low thickness and on the other hand also has excellent mechanical properties, in particular resistance to puncturing.

It has been found that the resistance to puncturing of polyolefin separators can be considerably improved if they are subjected, as a result of/within the scope of the conventional production method, to an additional thermal treatment, wherein a special parameter combination must be observed.

The object forming the basis of the invention is thus achieved by a biaxially oriented single-layer or multilayer porous film, which comprises at least one porous layer and this layer contains at least one propylene polymer,
(i) the porosity of the porous film is 30% to 80% and
(ii) the permeability of the porous film is ≤800 s (Gurley value), and
(iii) has an elastic modulus in the longitudinal direction of ≥300 N/mm$^2$ and
(iv) an elastic modulus in the transverse direction of ≥300 N/mm$^2$ and
(v) a density of at least 0.35 g/cm$^3$ and
(vi) a resistance to puncturing of at least 0.3 N/μm and
(vii) a thickness from 10 to 150 μm.

The film according to the invention with high porosity, very good resistance to puncturing and high permeability is surprisingly ideally suited as a separator in double layer capacitors and Li batteries. The Gurley value of the film according to the invention generally lies in a range from 20 to ≤800 s; preferably 50 to 800 s, particularly 100 to 650 s. The elastic modulus (modulus of elasticity) of the film according to the invention in the longitudinal direction is 300 to 3500 N/mm2, preferably 400 to 2000 N/mm2, particularly 600 to 1800 N/mm2, and in the transverse direction is 400 to 3000 N/mm2, preferably 500 to 2500 N/mm2, particularly 600 to 2200 N/mm2.

The film according to the invention comprises at least one porous layer constructed from propylene homopolymer and/or propylene block copolymers and containing 1-nucleation agent. Additional other polyolefins may optionally be contained in small quantities, provided they do not adversely influence the porosity and other essential properties. Furthermore, the microporous layer optionally additionally contains conventional additives, for examples stabilisers and/or neutralisation agents, in effective quantities in each case, The porosity of the film according to the invention is thus produced preferably by conversion of ß-crystalline polypropylene as the film is drawn, wherein at least one ß-nucleation agent is present in the film.

Suitable propylene homopolymers contain 98 to 100% by weight, preferably 99 to 100% by weight, of propylene units and have a melting point (DSC) of 150° C. or higher, preferably 155 to 170° C., and generally a melt flow index from 0.5 to 10 g/10 min, preferably 2 to 8 g/10 min, at 230° C. and a force of 2.16 kg (DIN 53735). Isotactic propylene homopolymers with an n-heptane soluble component of less than 15% by weight, preferably 1 to 10% by weight, constitute preferred propylene homopolymers for the layer. Isotactic propylene homopolymers with a high chain isotacticity of at least 96%, preferably 97-99% ($^{13}$C-NMR; triad method), can also be used advantageously. These raw materials are known as HIPPs (high isotactic polypropylene polymers) or HCPPs (high crystalline polypropylene polymers) in the prior art and are characterised by a high stereoregularity of the polymer chains, higher crystallinity and a higher melting point (compared with propylene polymers with a $^{13}$C-NMR isotacticity from 90 to <96%, which can be used equally).

Propylene block copolymers have a melting point of more than 140 to 175° C., preferably from 150 to 170° C., in particular 150 to 165° C., and a melting range that starts at above 120° C., preferably in a range of 125-140° C. The comonomer content, preferably ethylene content, for example is between 1 and 20% by weight, preferably 1 and 10% by weight. The melt flow index of the propylene block copolymers generally lies in a range from 1 to 20 g/10 min, preferably 1 to 10 g/10 min.

Where appropriate, the porous layer may additionally contain other polyolefins, provided they do not negatively influence the properties, in particular the porosity and mechanical strengths and permeability. For example, other polyolefins are statistical copolymers of ethylene and propylene with an ethylene content of 20% by weight or below, statistical copolymers of propylene with $C_4$-$C_8$ olefins with an olefin content of 20% by weight or below, terpolymers of propylene, ethylene and butylene with an ethylene content of 10% by weight or below and with a butylene content of 15% by weight or below, or other polyethylenes, such as LDPE, VLDPE, and LLDPE.

In principle, all known additives that promote the formation of β-crystals of the polypropylene as a polypropylene melt cools are suitable as β-nucleation agents for the porous layer. Such β-nucleation agents, and also their efficacy in a polypropylene matrix, are known per se in the prior art and will be described in detail hereinafter.

Various crystalline phases of polypropylene are known. When a melt is cooled, the α-crystalline PP is usually formed predominantly, of which the melting point lies in the range of approximately 158-165° C. By means of a specific temperature control, a low proportion of β-crystalline phase can be produced when cooling the melt, which phase has a much lower melting point compared with the monoclinic α-modification, with values of 144-150° C. In the prior art, additives are known that lead to an increased proportion of the β-modification when cooling the polypropylene, for example γ-quinacridone, dihydroquinacridine or calcium salts of phthalic acid.

For the purposes of the present invention, highly active β-nucleation agents are preferably used, which, when cooling a propylene homopolymer melt (PP proportion 100%), produce a β-proportion of 40-95%, preferably of 50-85% (DSC). The β-proportion is determined from the DSC of the cooled propylene homopolymer melt. By a way of example, a two-component β-nucleation system formed of calcium carbonate and organic dicarboxylic acids is preferred and is described in DE 3610644, to which reference is hereby expressly made. Calcium salts of dicarboxylic acids, such as calcium pimelate or calcium suberate, are particularly advantageous, as described in DE 4420989, to which reference is also expressly made. The dicarboxamides described in EP-A-0557721, in particular N,N-dicyclohexyl-2,6-naphthalene dicarboxamides, are suitable β-nucleation agents. Furthermore, the use of the nanoscale dicarboxylic acid salts, such as pimelates or suberates with a particles size of >500 nm, preferably <100 nm, as described in WO2011047797A1, are particularly suited. These nanoscale dicarboxylic acid salts are produced from a dispersion formed from a non-aqueous liquid phase and dispersed dicarboxylic acid salts. To this end, reference is expressly made to the nucleation agents described in WO2011047797A1. In addition to the β-nucleation agents, the observance of a certain temperature range and dwell times at these temperatures when cooling the melt film is key in order to attain a high proportion of β-crystalline polypropylene. The melt film is preferably cooled at a temperature from 60 to 140° C., in particular 80 to 130° C. Slow cooling also promotes the growth of the β-crystallites, and therefore the take-off speed, that is to say the speed at which the melt film passes over the first chilling roll, should be slow so that the necessary dwell times at the selected temperatures are sufficiently long. The take-off speed is preferably less than 25 m/min, in particular 1 to 20 m/min. The dwell times of the melt film on the take-off roll at the respective temperature should be longer than 15 s, preferably longer than 40 s, in particular longer than 60 s.

Particularly preferred embodiments of the microporous film according to the invention contain 50 to 10,000 ppm, preferably 50 to 5,000 ppm, in particular 50 to 2,000 ppm calcium pimelate or calcium suberate as ß-nucleation agent in the porous layer.

The porous layer generally contains 45 to <100% by weight, preferably 50 to 95% by weight, of propylene homopolymers and/or propylene block copolymer and 0.001 to 5% by weight, preferably 50-10,000 ppm, of at least one β-nucleation agent, in relation to the weight of the porous layer. For the case that further polyolefins, for example the above-described "other polyolefins", are contained the layer, the proportion of the propylene homopolymer or the block copolymer is reduced accordingly. Generally, the quantity of additional other polymers in the layer is 0 to <10% by weight, preferably 0 to 5% by weight, in particular 0.5 to 2% by weight, when these are additionally contained. Similarly, said propylene homopolymer or propylene block copolymer proportion is reduced when higher quantities of up to 5% by weight of nucleation agent are used. In addition, the layer may contain conventional stabilisers and neutralisation agents, and where appropriate further additives, in the conventional low quantities of less than 2% by weight.

In a preferred embodiment, the porous layer is formed from a mixture of propylene homopolymer and propylene block copolymer. The porous layer in these embodiments generally contains 50 to 85% by weight, preferably 60 to 75% by weight, of propylene homopolymer and 15 to 50% by weight of propylene block copolymer, preferably 25 to 40% by weight, and 0.001 to 5% by weight, preferably 50 to 10,000 ppm, of at least one β-nucleation agent, in relation to the weight of the layer, and where appropriate the aforementioned additives, such as stabilisers and neutralisation agents. Here too, it is true that further polyolefins can be contained in a quantity of 0 to <20% by weight, preferably 0.5 to 15% by weight, in particular 1 to 10% by weight, and the proportion of the propylene homopolymer or of the block copolymer is then reduced accordingly.

The microporous membrane film may be single or multilayer. The thickness of the membrane film generally lies in a range from 10 to 150 μm, preferably 15 to 100 μm. The microporous film can be provided with a corona, flame or plasma treatment in order to improve the filling with electrolyte.

In a multilayer embodiment, the film comprises further porous layers, which are formed as described above, wherein the composition of the different porous layers does not necessarily have to be identical.

The density of the microporous film generally lies in a range from at least 0.35 g/cm$^3$ to 0.6 g/cm$^3$, preferably 0.35 to 0.55 g/cm$^3$. For the use of the film as separator in double layer capacitors, the film should have a Gurley value from 50 to <500 s, preferably from 80 to 450 s. The bubble point of the film should not be above 350 nm, preferably 50 to 300 nm, and the mean pore diameter should lie in the range of 50 to 100 nm, preferably in the range 60-80 nm.

The film according to the invention has, in the longitudinal direction at 100° C. and 1 hour, a longitudinal shrinkage of ≤10%, preferably ≤5%, and in the transverse direction a shrinkage at 100° C. and 1 hour of ≤10%, preferably ≤5%, in particular >0 to <2%. The resistance to puncturing of the film according to the invention is at least 0.3N per μm film thickness, preferably at least 0.35 N per μm film thickness, wherein the resistance to puncturing is at most 1 N/μm, preferably at most 0.8 N/μm.

The porous film according to the invention is preferably produced by the flat film coextrusion method, which is known per se. Within the scope of this method an approach is adopted such that the mixtures of propylene homopolymer and/or propylene block copolymer and β-nucleation agent of the respective layer are mixed, melted in an extruder and, optionally jointly and simultaneously, are extruded or coextruded through a flat film die onto a take-off roll, on which the single-layer or multilayer melt film solidifies and cools, thus forming the β-crystallites. The cooling temperatures and cooling times are selected such that a maximum proportion of β-crystalline polypropylene is produced in the preliminary film. Generally, the proportion of β-crystallites in the preliminary film is 30-80%, preferably 40-70%. This preliminary film with a high proportion of ß-crystalline polypropylene is then biaxially drawn in such a way that, during the drawing, the β-crystallites are converted into α-polypropylene and a network-like porous structure is formed. The biaxially drawn film is then thermofixed and, where appropriate, subjected to corona, plasma or flame treatment on one or both sides.

The biaxial drawing (orientation) is generally performed successively, wherein drawing is preferably first performed longitudinally (in machine direction) and then transversely (perpendicularly to the machine direction).

The take-off roll or the take-off rolls is/are held at a temperature from 60 to 135° C., preferably 100 to 130° C., in order to promote the formation of a high proportion of ß-crystalline polypropylene in both layers.

For the drawing in the longitudinal direction the temperature ($T_L$) is less than 140° C., preferably 70 to 120° C. The longitudinal draw ratio lies in a range from 2:1 to 5:1, preferably 3:1 to 4.5:1. The drawing in the transverse direction is performed at a temperature ($T_Q$) of 120-150° C. The transverse draw ratio lies in a range from 2:1 to 9:1, preferably 3:1-8:1.

The longitudinal drawing is expediently performed with the aid of two rolls running at different speeds in accordance with the desired draw ratio, and the transverse drawing is expediently performed with the aid of an appropriate clip frame.

To this end the film following longitudinal drawing is optionally cooled again via rolls of which the temperature is controlled accordingly. Heating is then performed in what is known as the heating fields to the transverse drawing temperature ($T_Q$), which generally lies at a temperature of 120-150° C. Transverse drawing is then performed with the aid of an appropriate clip frame, wherein the transverse draw ratio lies in a range from 2:1 to 9:1, preferably 3:1-8:1. In order to attain the high porosities according to the invention, the transverse drawing is performed with a moderate to slow transverse drawing rate from >0 to 40%/s, preferably in a range from 0.5 to 30%/s, in particular 1 to 15%/s.

Where appropriate, as mentioned above, a surface of the film can be corona-, plasma- or flame-treated in accordance with one of the known methods following the biaxial drawing.

In accordance with the invention the biaxial drawing of the film is then followed by a special thermal treatment (thermofixing). This thermal post-treatment can be performed for example via rolls or an air heater box in line with the production process or in an isolated, separate method step, wherein the wound film is thermally treated on the roll or is treated during a winding process. A much greater resistance to puncturing is achieved with the aid of the special process parameters during the fixing, wherein the rest of the parameters are maintained, such that the film is suitable or remains suitable for the intended purpose.

Surprisingly, films in which the process parameters in the thermal treatment (thermofixing) have been selected such that the product from temperature during the thermofixing in degrees Celsius ($T_F$) and duration of the thermofixing in seconds ($t_F$) is at least 3000 have a much improved resistance to puncturing of at least 0.3 N/μm with simultaneous increase of the density to at least 0.35 g/cm3. The heating according to the invention of the thermal treatment (thermofixing) according to the invention is thus $T_F \times t_F \geq 3000°$ C.s, preferably $\geq 3500°$ C.s.

At lower temperature in the fixing fields ($T_F$) a longer dwell time in the fixing ($t_F$) is positive. The maximum temperature during the thermofixing ($T_F$) is $\leq 160°$ C., preferably $\leq 155°$ C.

The resistance to puncturing of polyolefin separators can thus be significantly improved. The thermal treatment (thermofixing) according to the invention of the film at least includes a period of $\geq 20$ s, preferably $\geq 25$ s, and a temperature in the range from 100 to 150° C., preferably 120-160° C., wherein the relationship according to the invention $T_F \times t_F \geq 3000°$ C.s, preferably $\geq 3500°$ C.s, must be observed.

This thermal post-treatment can be performed for example via rolls or an air heater box in line (online) with the production process or in a separate method step, wherein the wound film is thermally treated on the roll or is treating during a winding process. At low temperature in the thermofixing ($T_F$) a longer dwell time in the fixing ($t_F$) is positive. Insofar as the thermal post-treatment is performed in line with the production process, it is advantageous if the temperature in the thermofixing ($T_F$) is greater than the temperature in the transverse drawing (TQ), and the temperature in the transverse drawing (TQ) is in turn greater than the temperature in the longitudinal drawing (TL). The heating according to the invention of the thermal treatment (thermofixing), in particular with in line production, is thus $T_F \times t_F \geq 3000°$ C.s, preferably $\geq 3500°$ C.s, and $T_F > T_Q > T_L$.

It is particularly preferable if the temperature in the thermofixing ($T_F$) is at least 5° C. greater than the temperature in the transverse drawing ($T_Q$) and the temperature in the transverse drawing ($T_Q$) is in turn at least 5° C. greater than the temperature in the longitudinal drawing ($T_L$).

Where appropriate the film is conveyed in a converging manner immediately before or during the thermofixing, wherein the convergence is preferably 5-25%, in particular 8 to 20%, particularly preferably 10 to 15%. The term convergence is understood to mean a slight bringing together of the transverse drawing frame, such that the maximum width of the frame that is given at the end of the transverse drawing process is greater than the width at the end of the thermofixing. Of course, the same is true for the width of the film web. The degree to which the transverse drawing frame is brought together is specified as convergence, which is calculated from the maximum width of the transverse drawing frame $B_{max}$ and the end film width $B_{film}$ in accordance with the following formula:

$$\text{Convergence}[\%] = 100 \times (B_{max} - B_{film})/B_{max}$$

The porous film according to the invention, as a result of the high resistance to puncturing, demonstrates considerable advantages compared to paper separators, non-wovens and conventional polyolefin separators. In particular the microporous film is characterised by a much better mechanical strength and also high processing reliability with the manufacture of lithium batteries or double layer capacitors. Furthermore, said films demonstrate a much lower rejection with finished lithium batteries or double layer capacitors. Thicker conventional separators can also be replaced by thinner separators according to the invention with the greater resistance to puncturing, which leads to an increase of the energy density in the energy storage medium.

In order to characterise the raw materials and the films, the following measurement methods were used:

Melt Flow Index

The melt flow index of the propylene polymers was measured in accordance with DIN 53 735 at 2.16 kg load and 230° C.

Melting Point

In the context of the present invention the melting point is the maximum of the DSC curve. In order to determine the melting point, a DSC curve with a heating and cooling rate of 10 K/1 min in the range from 20 to 200° C. was recorded. In order to determine the melting point, the second heating curve was evaluated once cooled at 10 K/1 min in the range from 200 to 20° C., as is usual.

ß-Content of the Preliminary Film:

The ß-content of the preliminary film was also determined via a DSC measurement, which was performed on the preliminary film as follows: The preliminary film was first heated in the DSC at a heating rate of 10 K/min to 220° C. and was melted and cooled again. The degree of crystallinity $K_{\beta,Dsc}$ was determined from the 1st heating curve as ratio of the melt enthalpies of the ß-crystalline phase ($H_\beta$) to the sum of the melt enthalpies of ß- and α-crystalline phase ($H_\beta+H_\alpha$).

$$\beta - \text{Content}[\%] = -\frac{H\beta}{H\alpha + H\beta} * 100$$

Density:

The density (δSep) was determined in accordance with DIN 53 479, method A.

Porosity:

As porosity, the free volume in the separator film for access of the electrolyte was calculated in % as follows:

$$\text{Porosity}[\%] = -\frac{\delta Sep - 0,925}{0,925} * 100[\%]$$

Here, a density of the polypropylene of 0.925 g/cm³ was used as a basis.

Permeability (Gurley Value)

The permeability of the films was measured using the Gurley Tester 4110 in accordance with ASTM 726-58. Here, the time (in sec) required by 100 cm³ of air to permeate through the label surface of 1 inch² (6.452 cm²) was determined. The pressure difference over the film corresponds here to the pressure of a water column of 12.4 cm height. The required time then corresponds to the Gurley value.

Shrinkage:

The longitudinal and transverse shrinkage values are based on the respective length extension of the film (lengthwise $L_0$ and transversely $Q_0$) prior to the shrinkage process. The longitudinal direction is the machine direction, and the transverse direction is defined accordingly as the direction transverse to the machine direction. The test specimen measuring 10*10 cm² was shrunk in a convection oven at the respective temperature (100° C.) over a period of 60 min. The remaining length extensions of the test specimen lengthwise and transversely were then determined again ($L_1$ and $Q_1$). The difference of the determined length extensions compared to the original length $L_0$ and $Q_0$ times 100 were specified as shrinkage in %.

$$LongitudinalShrinkage\ L_s[\%] = \frac{L_0 - L_1}{L_0} * 100[\%]$$

$$TransverseShrinkage\ Q_s[\%] = \frac{Q_0 - Q_1}{Q_0} * 100[\%]$$

This determination method for the longitudinal and transverse shrinkage corresponds to DIN 40634.

Elastic Modulus

The elastic modulus was determined in accordance with DIN-ISO 527 (tensile modulus).

Resistance to Puncturing (Static))

The static resistance to puncturing was determined in accordance with ASTM F 1306.

Dynamic Resistance to Puncturing

The dynamic resistance to puncturing was determined in accordance with ASTM D3420.

The invention will now be explained by the following examples.

EXAMPLE 1

Following the extrusion method a single-layer preliminary film was extruded from a flat film die at an extrusion temperature of, in each case, 240° C. to 250° C. This preliminary film was first removed on a chilling roll and cooled. The preliminary film was then heated to the longitudinal drawing temperature and was drawn lengthwise over rolls running at different speeds. The film was then passed over chilling rolls and cooled. The film was then guided into the heating spring of the transverse drawing frame, heated to the transverse drawing temperature and oriented in the transverse direction. Following this transverse orientation, thermofixing was performed, during which the film was conveyed in a converging manner. The film had the following composition:

approximately 80 by weight of highly isotactic propylene homopolymer (PP) with a $^{13}$C-NMR isotacticity of 97% and an n-heptane-soluble proportion of 2.5% by weight (based on 100% PP) and a melting point of 165° C.; and a melt flow index of 2.5 g/10 min at 230° C. and 2.16 kg load (DIN 53 735) and approximately 20% by weight of propylene/ethylene block copolymer with an ethylene proportion of 5% by weight in relation to the block copolymer and an MFI (230° C. and 2.16 kg) of 6 g/10 min and a melting point (DSC) of 165° C., and 0.04% by weight of Ca pimelate as ß-nucleation agent.

In both layers the film additionally contained stabiliser and neutralisation agent in conventional low quantities.

More specifically the following conditions and temperatures were selected for the production of the film:

extrusion: extrusion temperature 235° C.
take-off roll: temperature 125° C.,
take-off speed: 4 m/min
dwell time on the take-off roll: 60 s
longitudinal drawing: drawing roll T=90° C.
longitudinal drawing by the factor of 3.8
transverse drawing: heating field T=125° C.
drawing field T=125° C.
transverse drawing by the factor of 5.0
fixing: T=130° C.
convergence 10%
dwell time in the fixing field: 40 s The porous film thus produced was approximately 25 μm thick. The film had a density of 0.35 g/cm³ and had a uniform white-opaque appearance. A value of 8700 mN was determined as resistance to puncturing, which corresponds to 0.35 N/μm.

EXAMPLE 2

A film was produced as described in Example 1. By contrast to Example 1, the temperature in the thermofixing was raised to 145° C. The dwell time in the fixing was reduced to 25 s and a convergence of 12.5% was set. For the rest, the composition of the film was unchanged and the other method conditions were maintained. The film had a density of 0.37 g/cm³ and demonstrated a uniform white/opaque appearance. A value of 8900 mN was determined as resistance to puncturing, which corresponds to 0.36 N/μm.

EXAMPLE 3

A film was produced as described in Example 1. By contrast to Example 1, the temperature in the thermofixing was raised to 150° C. The dwell time in the fixing was reduced to 30 s and a convergence of 8% was set. For the rest, the composition of the film was unchanged and the other method conditions were maintained. The film had a density of 0.41 g/cm$^3$ and demonstrated a uniform white/opaque appearance. A value of 8800 mN was determined as resistance to puncturing, which corresponds to 0.35 N/μm.

EXAMPLE 4

A film was produced as described in Example 1. By contrast to Example 1, the temperature in the thermofixing was raised to 155° C. The dwell time in the fixing was reduced to 30 s and a convergence of 8% was set. For the rest, the composition of the film was unchanged and the other method conditions were maintained. The film had a density of 0.44 g/cm$^3$ and demonstrated a uniform white/opaque appearance. A value of 8900 mN was determined as resistance to puncturing, which corresponds to 0.37 N/μm.

EXAMPLE 5

A film was produced as described in Example 1. By contrast to Example 1 the take-off speed was increased to 4.5 m/min and the temperature in the thermofixing was raised to 150° C. The dwell time in the fixing was raised to 40 s and a convergence of 10% was set. For the rest, the composition of the film was unchanged and the other method conditions were maintained. The film thickness reduced here to 21 μm. The film had a density of 0.43 g/cm$^3$ and demonstrated a uniform white/opaque appearance. A value of 8700 mN was determined as resistance to puncturing, which corresponds to 0.41 N/μm.

EXAMPLE 6

A film was produced as described in Example 1. By contrast to Example 1, the take-off speed was raised to 5 m/min and the temperature in the thermofixing was raised to 150° C. The dwell time in the fixing was raised to 40 s and a convergence of 10% was set. For the rest, the composition of the film was unchanged and the other method conditions were maintained. The film thickness reduced here to 18 μm. The film had a density of 0.43 g/cm$^3$ and demonstrated a uniform white/opaque appearance. A value of 8400 mN was determined as resistance to puncturing, which corresponds to 0.47 N/μm.

COMPARATIVE EXAMPLE 1

A film was produced as described in Example 1. By contrast to Example 1, the temperature in the thermofixing was raised to 140° C. The dwell time in the fixing was 20 s. For the rest, the composition of the film was unchanged and the other method conditions were maintained. The film was 25 μm thick, had a density of 0.33 g/cm$^3$ and demonstrated a uniform white/opaque appearance. A value of 6200 mN was determined as resistance to puncturing, which corresponds to 0.25 N/μm.

COMPARATIVE EXAMPLE 2

A film was produced as described in Example 1. By contrast to Example 1, the temperature in the thermofixing was raised to 145° C. The dwell time in the fixing was 20 s. For the rest, the composition of the film was unchanged and the other method conditions were maintained. The film was 25 μm thick and had a density of 0.34 g/cm$^3$ and demonstrated a uniform white/opaque appearance. A value of just 6100 mN was determined as resistance to puncturing, which corresponds to 0.24 N/μm.

COMPARATIVE EXAMPLE 3

A film was produced as described in Example 1. By contrast to Example 1, the temperature in the thermofixing was raised to 140° C. The dwell time in the fixing was 20 s and the convergence was 5%. For the rest, the composition of the film was unchanged and the other method conditions were maintained. The film was 25 μm thick and had a density of 0.26 g/cm$^3$ and demonstrated a uniform white/opaque appearance. A value of just 5300 mN was determined as resistance to puncturing, which corresponds to 0.21 N/μm.

COMPARATIVE EXAMPLE 4

A film was produced as described in Example 1. By contrast to Example 1, the take-off speed was lowered to 2.5 m/min and the temperature in the thermofixing was raised to 140° C. The dwell time in the fixing was raised to 20 s and a convergence of 5% was set. For the rest, the composition of the film was unchanged and the other method conditions were maintained. The film thickness increased to 40 μm. The film had a density of 0.33 g/cm$^3$ and demonstrated a uniform white/opaque appearance. A value of 11300 mN was determined as resistance to puncturing, which corresponds to 0.28 N/μm.

COMPARATIVE EXAMPLE 5

A film was produced as described in Example 1. By contrast to Example 1, the temperature in the thermofixing was reduced to 110° C. The dwell time in the fixing was reduced to 20 s and a convergence of 10% was set. For the rest, the composition of the film was unchanged and the other method conditions were maintained. The film thickness reduced here to 25 μm and had a density of 0.32 g/cm$^3$ and demonstrated a uniform white/opaque appearance. A value of 6400 mN was determined as resistance to puncturing, which corresponds to 0.26 N/μm.

COMPARATIVE EXAMPLE 6

A film was produced as described in Example 1. By contrast to Example 1, the temperature of the take-off roll was lowered to 110° C. The temperature in the thermofixing was set to 110° C. The dwell time in the fixing however was reduced to 20 s and a convergence of 10% was set. For the rest, the composition of the film was unchanged and the other method conditions were maintained. The film was 25 μm thick, had a density of 0.6 g/cm$^3$ and demonstrated a uniform white/opaque appearance. A value of 9800 mN was determined as resistance to puncturing, which corresponds to 0.39 N/μm. The determined Gurley value of 2400 s however is unacceptable for use of the film as a separator.

TABLE 1

|  | Thickness/ μm | Density/ g/cm³ | Porosity/% | Gurley/ s | Fixing temp. $T_F$/° C. | Fixing time/$t_F$/s | Convergence/% | Shrinkage MD/% 1 h@100° C. | Shrinkage TD/% 1 h@100° C. | Static resistance to puncturing N | Static resistance to puncturing N/μm | $T_F \times t_F$ |
|---|---|---|---|---|---|---|---|---|---|---|---|---|
| Ex. 1 | 25 | 0.35 | 62 | 210 | 130 | 40 | 10 | 3.4 | 1.8 | 8.7 | 0.35 | 5200 |
| Ex. 2 | 25 | 0.37 | 59 | 263 | 145 | 25 | 12.5 | 2.5 | 0.6 | 8.9 | 0.36 | 3625 |
| Ex. 3 | 25 | 0.41 | 55 | 293 | 150 | 30 | 8 | 2.3 | 0.3 | 8.8 | 0.35 | 4500 |
| Ex. 4 | 24 | 0.44 | 52 | 384 | 155 | 30 | 8 | 1.8 | 0.2 | 8.9 | 0.37 | 4650 |
| Ex. 5 | 21 | 0.43 | 53 | 420 | 150 | 40 | 10 | 2.8 | 0.6 | 8.7 | 0.41 | 6000 |
| Ex. 6 | 18 | 0.43 | 53 | 400 | 150 | 40 | 10 | 2.7 | 0.4 | 8.4 | 0.47 | 6000 |
| Comp. 1 | 25 | 0.33 | 64 | 140 | 140 | 20 | 10 | 2.2 | 3.2 | 6.2 | 0.25 | 2800 |
| Comp. 2 | 25 | 0.34 | 63 | 158 | 145 | 20 | 10 | 2.0 | 2.5 | 6.1 | 0.24 | 2900 |
| Comp. 3 | 25 | 0.26 | 72 | 95 | 140 | 20 | 5 | 2.2 | 3.3 | 5.3 | 0.21 | 2800 |
| Comp. 4 | 40 | 0.33 | 64 | 160 | 140 | 20 | 5 | 3.7 | 3.6 | 11.3 | 0.28 | 2800 |
| Comp. 5 | 25 | 0.32 | 60 | 140 | 110 | 20 | 10 | 6.2 | 10.5 | 6.4 | 0.26 | 2200 |
| Comp. 6 | 25 | 0.6 | 36 | 2400 | 110 | 20 | 10 | 3.8 | 4.5 | 9.8 | 0.39 | 2200 |

TABLE 2

|  | Thickness/ μm | Density/ g/cm³ | Porosity/% | Gurley/ s | Fixing temp. $T_F$/° C. | Fixing time/$t_F$/s | Dynamic resistance to puncturing N | Dynamic resistance to puncturing N/μm |
|---|---|---|---|---|---|---|---|---|
| Ex. 1 | 25 | 0.35 | 62 | 210 | 130 | 40 | 6.5 | 0.26 |
| Ex. 2 | 25 | 0.37 | 59 | 263 | 145 | 25 | 7.2 | 0.288 |
| Ex. 3 | 25 | 0.41 | 55 | 293 | 150 | 30 | 7.5 | 0.3 |
| Ex. 4 | 24 | 0.44 | 52 | 384 | 155 | 30 | 7.9 | 0.32917 |
| Ex. 5 | 21 | 0.43 | 53 | 420 | 150 | 40 | 6.9 | 0.32857 |
| Ex. 6 | 18 | 0.43 | 53 | 400 | 150 | 40 | 7.4 | 0.41111 |
| Comp. 1 | 25 | 0.33 | 64 | 140 | 140 | 20 | 4.6 | 0.184 |
| Comp. 2 | 25 | 0.34 | 63 | 158 | 145 | 20 | 4.7 | 0.188 |
| Comp. 3 | 25 | 0.26 | 72 | 95 | 140 | 20 | 5.3 | 0.212 |
| Comp. 4 | 40 | 0.33 | 64 | 160 | 140 | 20 | 9.6 | 0.24 |
| Comp. 5 | 25 | 0.32 | 60 | 140 | 110 | 20 | 6.1 | 0.244 |
| Comp. 6 | 25 | 0.6 | 36 | 2400 | 110 | 20 | 8.3 | 0.332 |

The invention claimed is:

1. A method for producing a biaxially oriented single-layer or multilayer porous film, wherein the film comprises at least one porous layer and this layer contains at least one propylene polymer,
   (i) the porosity of the porous film is 30% to 80%,
   (ii) the permeability of the porous film is ≤800 s (Gurley value),
   (iii) has an elastic modulus in the longitudinal direction of ≥300 N/mm²,
   (iv) an elastic modulus in the transverse direction of ≥300 N/mm²,
   (v) a density of at least 0.35 g/cm³,
   (vi) a resistance to puncturing of at least 0.3N/μm and
   (vii) a thickness from 10 to 150 μm,
   comprising the following steps:
   (i) extruding a single-layer or multilayer polypropylene film in which propylene polymer and ß-nucleation agent are melted in an extruder and are extruded through a flat film die onto a take-off roll,
   (ii) cooling and solidifying the extruded melt film, thus forming ß-crystallites,
   (iii) drawing the film in the longitudinal direction and then in the transverse direction, and
   (iv) performing a thermofixing, in which the product of temperature during the thermofixing in degrees Celsius ($T_F$) and duration of the thermofixing in seconds ($t_F$) is at least 3500° C.s ($T_F \times t_F \geq 3500$° C.s) to 6,000° C.s and wherein the porosity is produced by conversion of ß-crystalline polypropylene as the film is drawn, wherein at least one ß-nucleation agent is present in the film and wherein the film has been subjected to the thermofixing after the biaxially stretching in step (iii), in which the product of temperature during the thermofixing in degrees Celsius ($T_F$) and duration of the thermofixing in seconds (tF) is ≥3500° C.s ($T_F \times t_F \geq 3500$° C.s) to 6,000° C.s and wherein the temperature during the thermofixing is in the range from 120-160° C. and wherein the treatment is applied for at least 25 seconds.

2. The method according to claim 1, wherein the propylene polymer is a propylene homopolymer and/or a propylene block copolymer.

3. The method according to claim 1, wherein the ß-nucleation agent is a calcium salt of pimelic acid and/or suberic acid.

4. The method according to claim 1, wherein the film contains propylene homopolymer and propylene block copolymer.

5. The method according to claim 1, wherein the film contains 50 to 85% by weight of propylene homopolymer, 15 to 50% by weight of propylene block copolymer, and 50 to 10,000 ppm of ß-nucleation agent.

6. The method according to claim 1, wherein the density of the film lies in a range 0.35 to 0.6 g/cm³.

7. The method according to claim 1, wherein the film has a thickness from 15 to 100 μm.

8. The method according to claim 1, wherein the propylene polymer was not produced by use of metallocene catalyst.

9. The method according to claim 1, wherein the permability of the porous film is 20 to ≤800 s (Gurley value).

10. The method according to claim 1, wherein the elastic modulus of the film in the longitudinal direction is 300 to 3500 N/mm².

11. The method according to claim 1, wherein the elastic modulus of the film in the transverse direction is 400 to 3000 N/mm$^2$.

12. The method according to claim 1, wherein the shrinkage in the longitudinal direction at 100° C. and 1 hour is ≤10%.

13. The method according to claim 1, wherein the shrinkage in the transverse direction at 100° C. and 1 hour is ≤10%.

14. The method according to claim 1, wherein the resistance to puncturing of the film according to the invention is at least 0.35 N/μm film thickness.

15. The method according to claim 1, wherein the temperature in the thermofixing ($T_F$) is greater than the temperature in the transverse drawing ($T_Q$) and the temperature in the transverse drawing ($T_Q$) is in turn greater than the temperature in the longitudinal drawing ($T_L$).

16. The method according to claim 1, wherein the temperature during the thermofixing is in the range from 130-155° C. and wherein the treatment is applied for 25 to 40 seconds.

17. The method according to claim 1, wherein the temperature during the thermofixing is in the range from 130-150° C. and wherein the treatment is applied for 30 to 40 seconds.

* * * * *